C. H. FARNSWORTH.
SHARPENING ATTACHMENT FOR MOWING MACHINES.
APPLICATION FILED NOV. 13, 1915.
1,227,410.
Patented May 22, 1917.
2 SHEETS—SHEET 1.
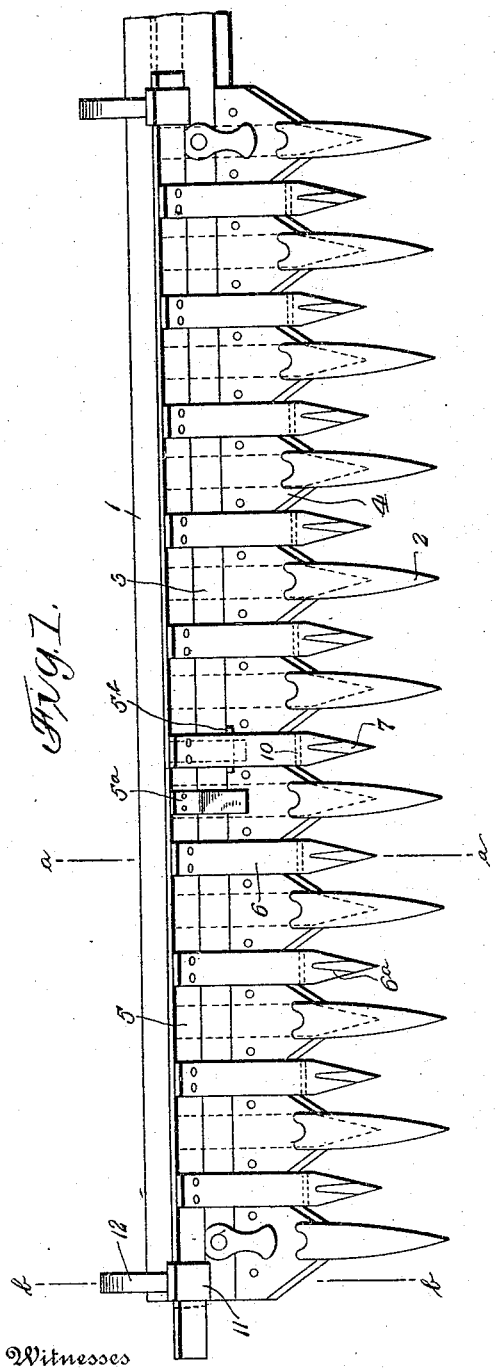
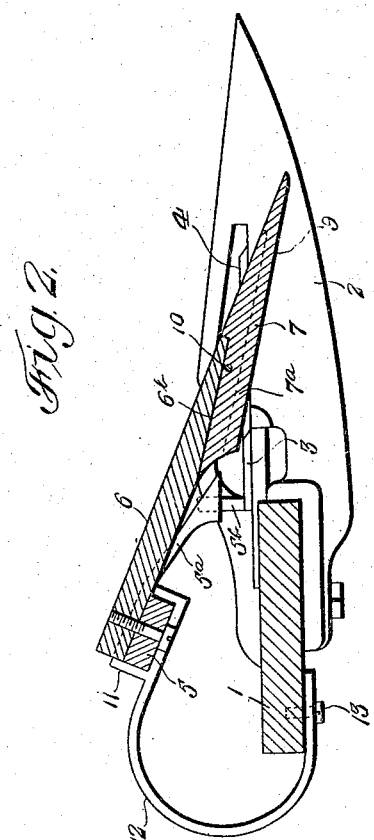
Witnesses
Inventor
C. H. Farnsworth,
By Victor J. Evans
Attorney

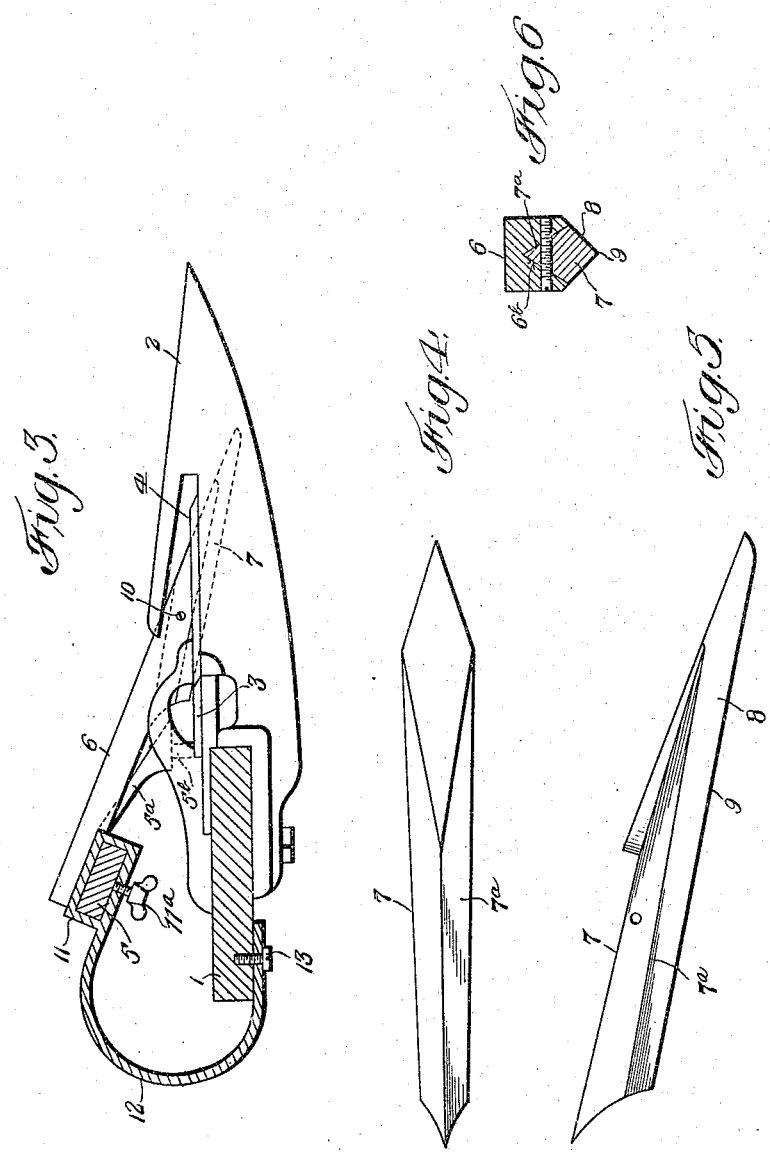

UNITED STATES PATENT OFFICE.

CHARLES HERBERT FARNSWORTH, OF BRICELAND, CALIFORNIA, ASSIGNOR OF ONE-HALF TO TOSTEN BROS., OF BRICELAND, CALIFORNIA.

SHARPENING ATTACHMENT FOR MOWING-MACHINES.

1,227,410.                Specification of Letters Patent.       Patented May 22, 1917.

Application filed November 13, 1915. Serial No. 61,349.

*To all whom it may concern:*

Be it known that I, CHARLES H. FARNSWORTH, a citizen of the United States, residing at Briceland, in the county of Humboldt and State of California, have invented new and useful Improvements in Sharpening Attachments for Mowing-Machines, of which the following is a specification.

This invention is an improved sharpening attachment for mowing machines, adapted to be arranged on the cutting apparatus of a mowing machine for sharpening the cutter plates or knives and used while the machine is in motion and also adapted to be arranged out of operative relation to the knives so as to be out of the way when the machine is in use in mowing and yet without the necessity of having to remove the sharpening device from the machine.

The invention consists in the construction, combination and arrangement of devices hereinafter described and claimed.

In the accompanying drawings:—

Figure 1 is a plan of a part of the cutting apparatus of a mowing machine provided with a sharpening attachment constructed in accordance with my invention, the attachment being shown in full lines arranged in position for sharpening the cutter plates or knives and being shown in dotted lines arranged out of operation.

Fig. 2 is a sectional view of the same on the plane indicated by the line $a$—$a$ of Fig. 1.

Fig. 3 is a similar view on the plane indicated by the line $b$—$b$ of Fig. 1.

Figs. 4—5—6 are detail views.

Fig. 7 is a detailed perspective view of the cam.

For the purposes of this specification the finger bar of a mowing machine is indicated at 1 provided with the fingers or guards 2 and the cutter bar is indicated at 3 provided with the usual removable triangular knives or plates 4. The cutter bar is reciprocated by the usual means when the machine is in motion.

My improved sharpening attachment comprises a bar 5 on which are secured the rear ends of a series of sharpening stone carrying arms 6, which are appropriately spaced according to the width of the cutter plates. Each arm 6 is provided at its outer end with a V-shaped notch $6^a$ and on its under side with an inverted V-shaped groove $6^b$ the front end of which communicates with said notch. A stone 7 is attached to each arm and is formed with a V-shaped head $7^a$ which fits in the notch of the arm, each stone being cross sectionally, approximately diamond shaped and adapted to fit with its upper side in the groove and presenting downwardly converging sides 8 which form a sharpening edge 9 at their intersection. The stones are secured to the arms by means of screws 10 which permit the detachment of the stones for renewal by others when the stones become worn.

The bar 5 passes through and is longitudinally adjustable in guides 11 each of which is provided with a substantially U-shaped attaching spring or yoke 12. The bar is adjustably secured in the guides by set screws $11^a$. The springs or yokes are on the rear side of the cutter and finger bar, the lower arms of the former passing under the finger bar being provided with clamping screws 13 for securing the yokes to the lower side of the finger bar and thereby attaching the sharpening device to the cutting mechanism of the mowing machine and at the same time, by reason of the springs, permitting some vertical movement of the sharpening device. The bar 5 has an operating arm $5^a$, which arm is arranged near the center and at right angles to said bar and extends forwardly and downwardly from said bar. An operating cam $5^b$ is secured on the cutter bar. When the sharpening attachment is in operation, the cam passes back and forth under the arm $5^a$ as the cutter bar reciprocates and coacts with the springs 12 to raise and lower the stones and cause the stones to bear on the cutter blades and permit the cutter blades to slide back and forth under the stones so that the edges of the blades are sharpened, as will be understood.

When it is desired to put the sharpening attachment out of operation, this may be accomplished by adjusting the bar 5, endwise to carry the arm $5^a$ beyond the reach of the cam and to also arrange the sharpening stones with their outer ends bearing on the guard fingers as indicated in dotted lines in Fig. 1, the set screws $11^a$ being employed to secure the bar 5 in such adjusted position, The cam $5^b$ is shown in detail in Fig. 7 and is provided with upwardly converging cam surfaces $5^c$.

Having thus described my invention, I claim:—

1. A sharpening attachment for mowing machines comprising guides, U-shaped resilient yokes having their upper ends secured to the guides, said yokes provided with means for securing their lower ends to the finger bar of a mowing machine cutting apparatus, a bar mounted for slidable movement in said guides, and sharpening stones carried by the last named bar and adapted to bear either on the cutter plates or on the guard fingers according to the adjustment of the last named bar.

2. A sharpening attachment for mowing machines comprising guides, U-shaped resilient yokes having their upper ends secured to said guides, said yokes provided with means for securing their lower ends to the finger bar of a mowing machine cutting apparatus, a bar mounted for slidable movement in said guides, sharpening stones carried by the last named bar and adapted to bear either on the cutter plates or on the guard fingers according to the adjustment of the last named bar, and means to secure the last named bar in adjusted position.

3. A sharpening attachment for mowing machines comprising guides, U-shaped resilient yokes having their upper ends secured to the guides said yokes provided with means for securing their lower ends to the finger bar of a mowing machine cutting apparatus, a bar mounted for slidable movement in said guides, sharpening stones carried by the last named bar and adapted to bear either on the cutter plates or on the guard fingers according to the adjustment of the last named bar, and means to impart vertical oscillatory movement to the last named bar and the sharpening stones to carry the stones over the points of the cutter plates.

4. In combination with the finger bar and cutter bar of a mowing machine, a cam on the cutter bar for reciprocating movement therewith, U-shaped resilient yokes attached to the finger bar and extending rearwardly therefrom and upwardly thereover and provided at their upper ends with guides, a bar arranged for endwise movement in said guides and provided with an operating arm for engagement with said cam to lift said arm when the last named bar is moved in one direction and lower said arm when the last named bar is moved in the reverse direction and stone carrying arms also secured to the last named bar.

5. In combination with the finger bar and cutter bar of a mowing machine a cam on the cutter bar for reciprocating movement therewith, U-shaped resilient yokes attached to the finger bar and extending rearwardly therefrom and upwardly thereover and provided at their upper ends with guides, a bar arranged in said guides and provided with an operating arm for engagement with said cam, stone carrying arms also secured to the last named bar, each of said stone carrying arms having a V-shaped notch in its outer end and a notch in its lower side at its outer end communicating with said notch, and each of the stones carried by said arms having a head adapted to fit in the notch and the body portion adapted to fit in the groove.

In testimony whereof I affix my signature in presence of two witnesses.

CHARLES HERBERT FARNSWORTH.

Witnesses:
MORTIMER WRIGHT,
D. J. JOHNSON.

Copies of this patent may be obtained for five cents each, by addressing the "Commissioner of Patents, Washington, D. C."